Patented July 30, 1946

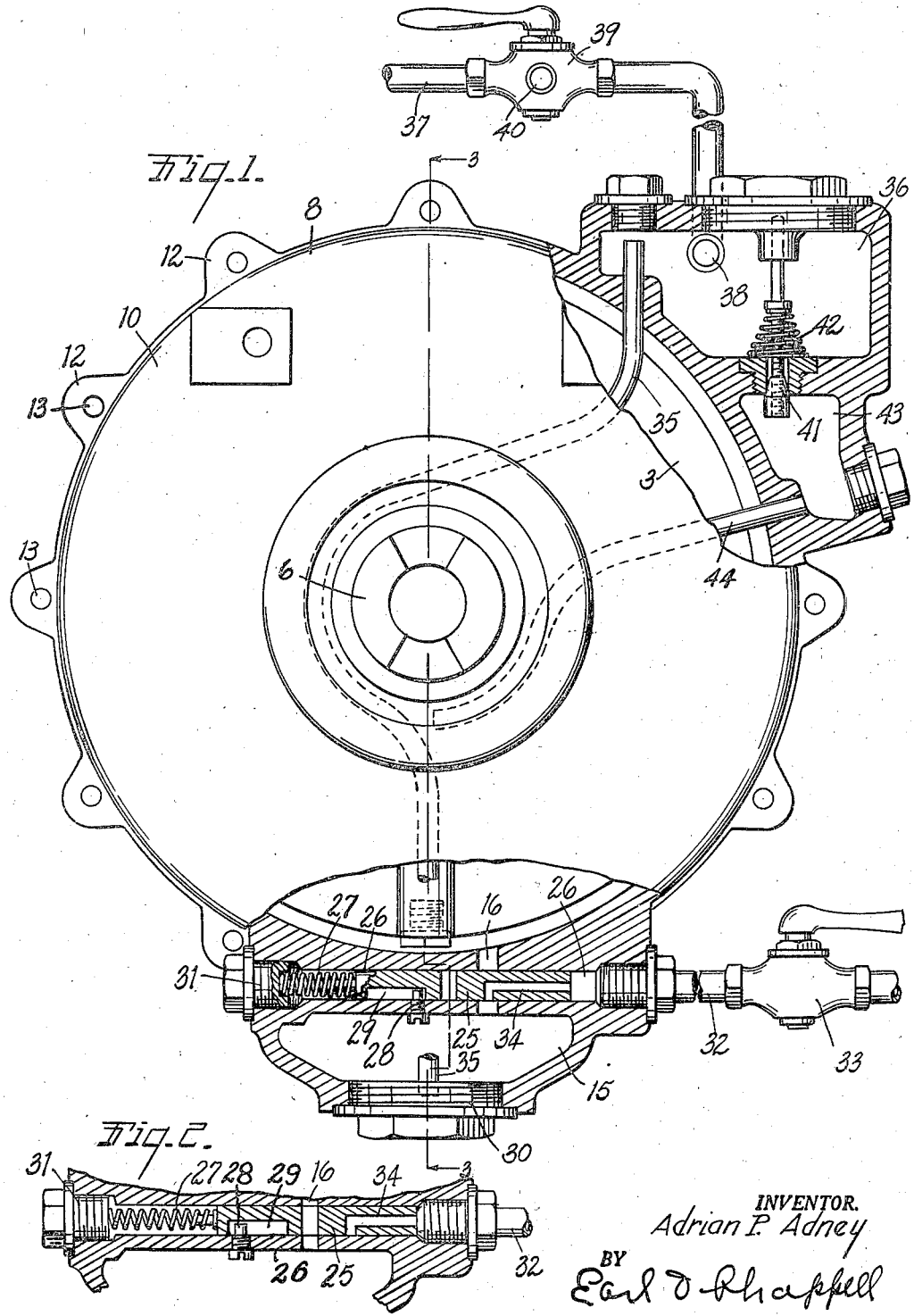

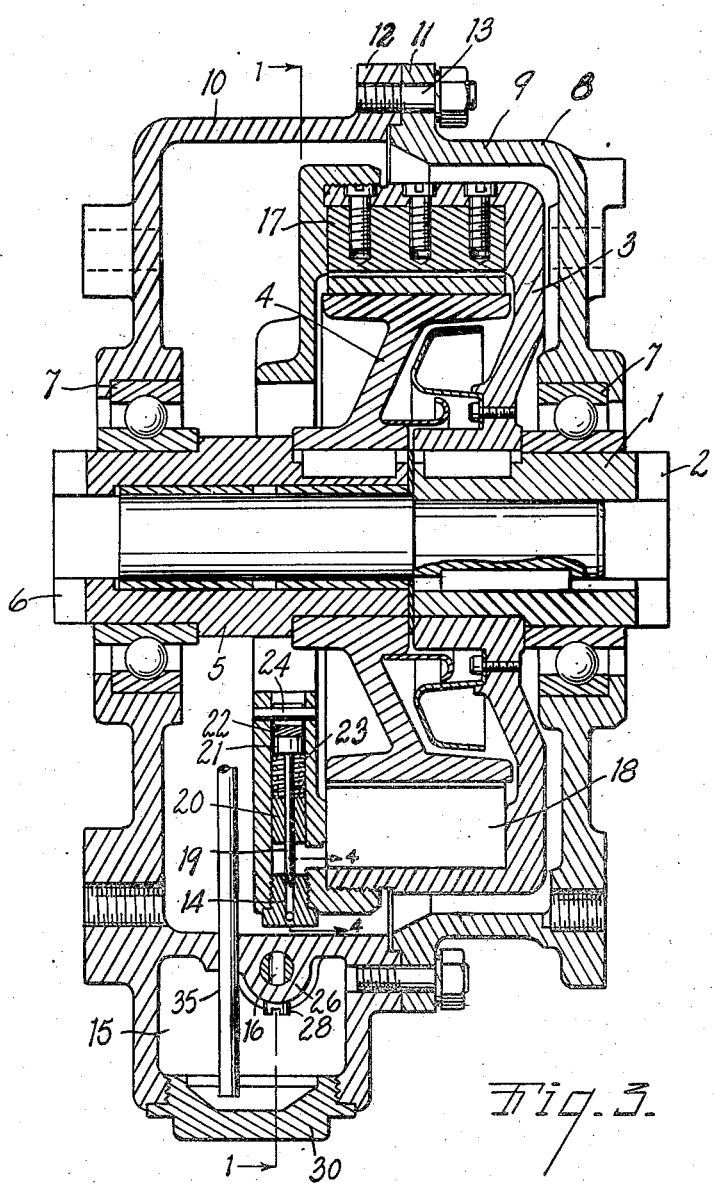
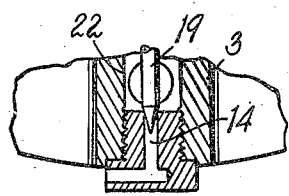
Fig. 3.
Fig. 4.
INVENTOR.
Adrian P. Adney

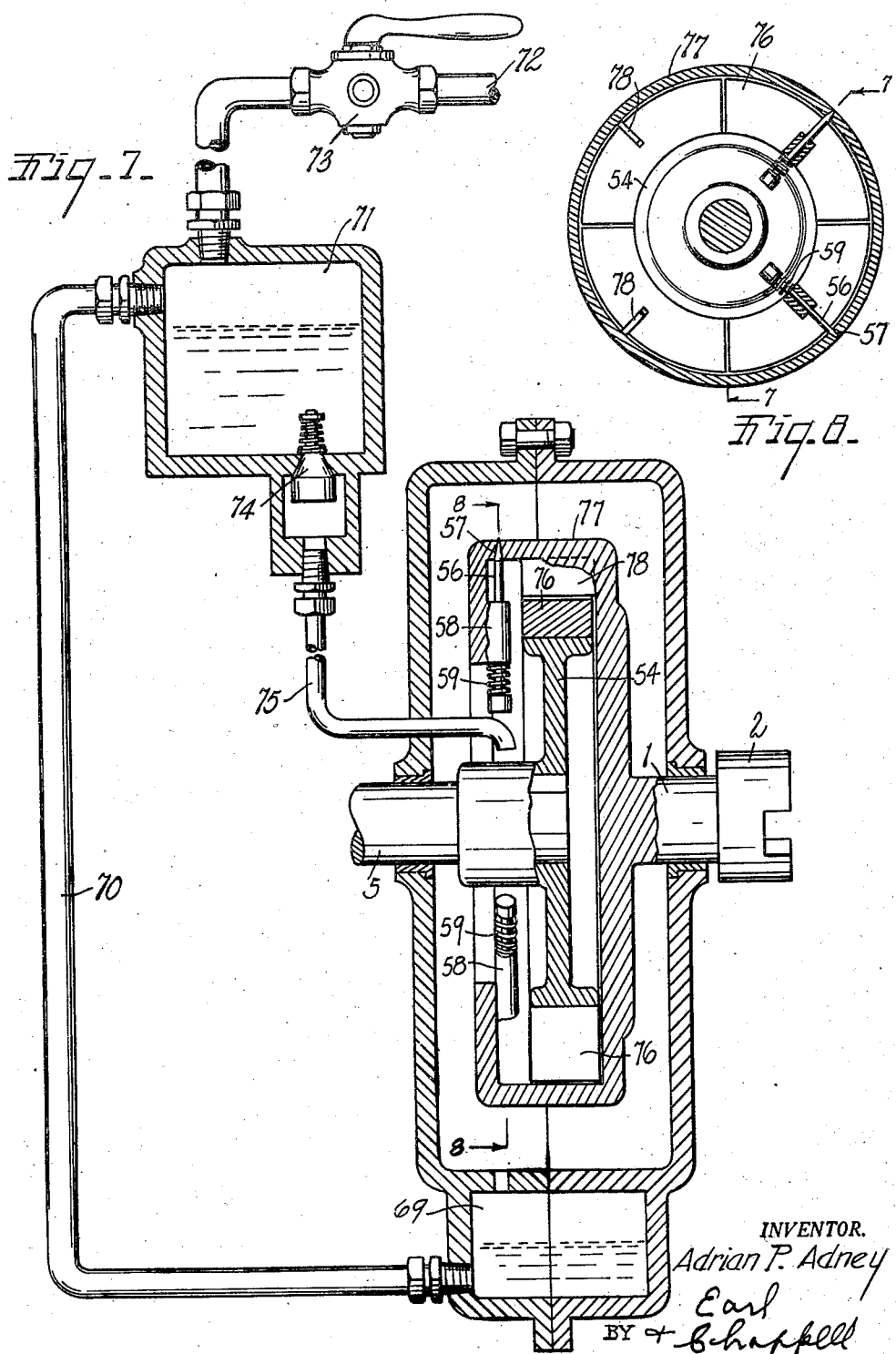

2,404,822

UNITED STATES PATENT OFFICE 2,404,822

FLUID ACTUATED CLUTCH

Adrian P. Adney, Battle Creek, Mich., assignor to American-Marsh Pumps, Inc., Battle Creek, Mich., a corporation of Michigan Application August 16, 1943, Serial No. 498,785

31 Claims. (Cl. 192—85)

This invention relates to improvements in fluid actuated clutches.

The main objects of this invention are:

First, to provide a fluid actuated clutch, the actuation of which is subject to manual control, to be engaged when predetermined speeds are attained and to be automatically disengaged on the stopping of the prime mover or when the speed of the prime mover falls below a predetermined R. P. M.

Second, to provide a fluid actuated clutch which is highly desirable for use in motorized fire fighting apparatus of the type utilizing an internal combustion engine of the motor vehicle as the prime mover for the pump.

Third, to provide a clutch of the character described which is efficient and may be operated from a source of vacuum or a source of pressure.

Fourth, to provide a fluid actuated clutch in which the delivery of fluid to the clutch is manually controlled, the discharge of fluid from operative relation to the clutch elements being automatic when the speed of rotation of the driven element of the clutch falls below a predetermined R. P. M.

Fifth, to provide a fluid actuated clutch with simple means for manually controlling the delivery of fluid to the clutch, permitting the use of the prime mover, as the motor of a motor vehicle, for propelling the vehicle or for delivering power through the clutch.

Sixth, to provide a clutch having these several advantages which is very simple and compact in structure.

Further objects relating to details and economies of construction and operation will appear from the description to follow. The invention is clearly defined in the claims.

A structure embodying the features of the invention is clearly illustrated in the accompanying drawings, in which:

Fig. 1 is an end elevation of a clutch embodying the features of the invention, viewed from the power end, parts being broken away and other parts partially in vertical transverse section on line 1—1 of Fig. 3.

Fig. 2 is a fragmentary view partially in vertical section showing one of the valve elements in open position, it being shown in actuated position in Fig. 1.

Fig. 3 is a longitudinal section on line 3—3 of Fig. 1, parts being shown in full line for convenience in illustration.

Fig. 4 is an enlarged fragmentary section on line 4—4 of Fig. 3 showing details of the automatic closing and opening discharge valve for the actuating fluid.

Fig. 7 is a fragmentary view partially in section on line 7—7 of Fig. 8 showing a further modification or embodiment of my invention in which the return of the liquid is vacuum controlled.

Fig. 8 is a fragmentary view partially in transverse section on line 8—8 of Fig. 7.

Figure 5:
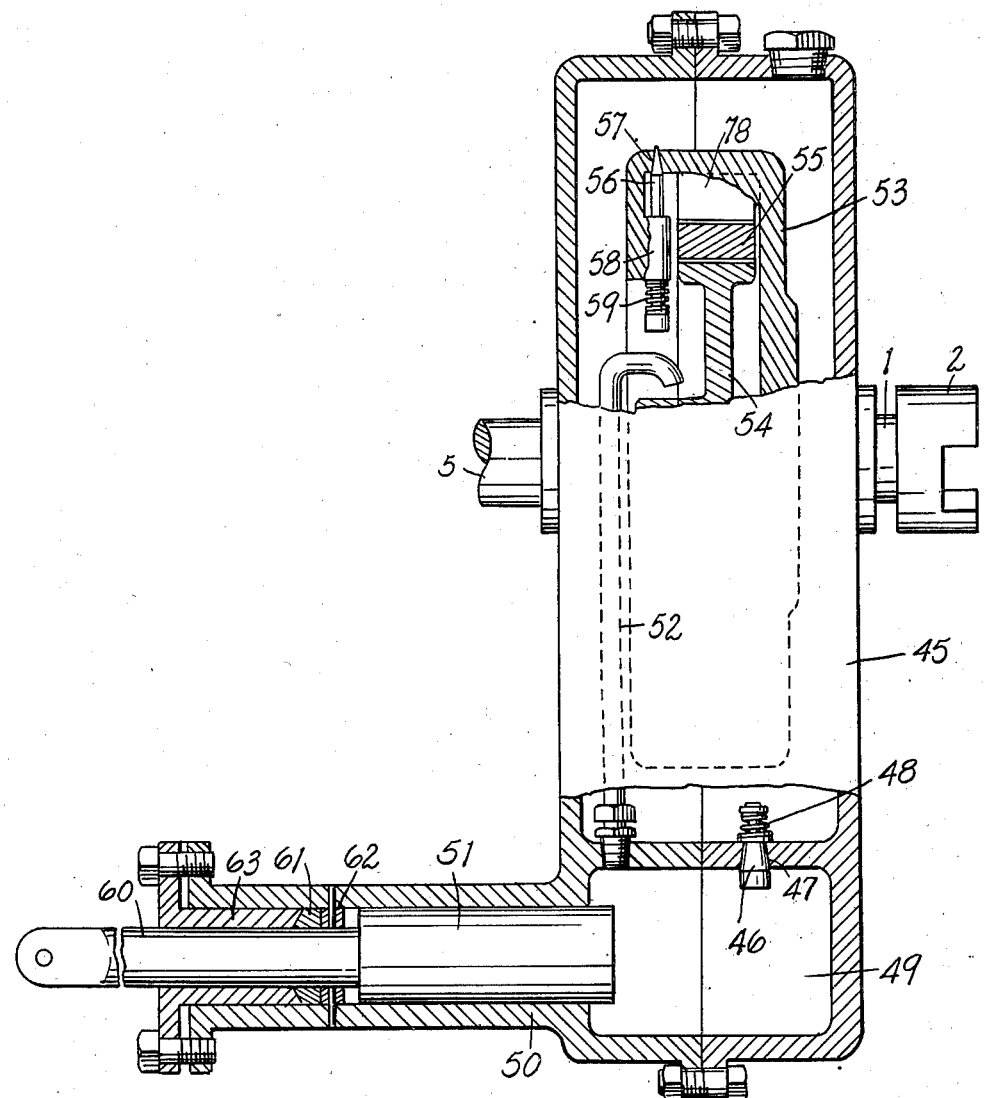
Fig. 5 is a fragmentary longitudinal section of a modified form or embodiment of the invention, the modification being in the means for manually delivering the liquid to the clutch and a modification in the form of the discharge valves.

In the preferred embodiment of the invention illustrated in Figs. 1 to 4 inclusive, the invention is shown adapted for use either with manually controlled suction or manually controlled air under pressure, thus adapting the structure for various uses where air under pressure is available and various uses where a vacuum is available. In Fig. 5 an embodiment of the invention is illustrated for use where neither vacuum nor air under pressure is available.

Reference being had to the drawings, 1 represents the power shaft which is provided with a coupling member 2 designed to be connected to a source of power, for instance, the crankshaft of an internal combustion engine. The key to this shaft is a chambered driving clutch element 3 within which is arranged a driven clutch element 4, the driven clutch element being secured to the driven shaft 5 which is provided with a coupling member 6 through which the driven member is connected to the machine, as for example, a centrifugal pump, not illustrated.

The shafts 1 and 5 are supported in suitable bearings, designated generally by the numerals 7, in a housing 8. This housing is made up of a pair of members 9 and 10 having flanges 11 and 12 respectively and secured together by means of suitable bolts or screws 13. This casing or housing is of the liquid type periphery so that liquid discharged therein is thrown out by centrifugal force through the discharge ports 14 of the member 3, drains down the walls thereof, and into the sump 15 through the drain holes 16. The chamber of member 3 is adapted to peripherally retain liquid except as it is discharged through the ports 14.

The driving member 3 has internal lugs 17 between which are engaged a series of movable clutch members 18 so that while these clutch members may be connected to rotate with the driven member, they are free to move radially thereof into and out of clutching engagement with the periphery of the member 4, which has a suitable cylindrical friction face. The movable clutch members 18 are actuated to clutching position by means of a liquid within the driving member 3 under the action of centrifugal force in the liquid, desirably mercury on account of its specific gravity.

The ports 14 are provided with valves 19 disposed radially and reciprocating in guide members 20, the valves being provided with weights 21 reciprocating and supported in the radial bores 22 in the casing (Figs. 3 and 4). The springs 23 are of such strength as to normally unseat or open the valves when the driving member 3 is at rest or when its speed is below a predetermined R. P. M. However, when its speed reaches or exceeds this rate the valves are closed, closing the ports or passages 14. It will be noted by reference to Fig. 4 that the discharge 14 is angled, its outlet facing rearwardly relative to the direction of rotation of the clutch member 3, so that the escape therefrom of the liquid is by gravity and it is not thrown outwardly with force that would result in undesirable turning action or atomizing action on the liquid. The pin 24 in the valve casing limits the inward movement or opening movement of the valve members under the tension of the springs.

With this arrangement the mercury or other liquid introduced into the clutch is retained while the driving clutch member is rotating at predetermined speed or when it is desired to engage the clutch and retain it in engagement.

As stated, the mercury drains from the casing into the sump 15 through the port 16. This drain opening 16 is controlled by a plunger valve 25 reciprocating in a suitable bore-like casing 26 and held in normally open position by the spring 27 (Fig. 2). It will be understood that in Fig. 1 the valve is shown in its closed position which, however, is not its normal position. The movement of the valve is controlled by the stop 28 engaging a slot 29 in the valve, the ends of the slot constituting stop members. This stop is accessible through the closure plug 30. The closure 31 for the valve bore is removable to permit the removing and assembling of the valve.

A pipe or conduit 32 is connected to the opposite end of the bore 26, this being adapted to supply air under pressure. A manually controlled valve 33 is provided, it being understood that in practice this is located in some convenient place. When pressure is turned on the valve 25 is moved to its position to close the drain opening 16 and to deliver air through the passage 34 into the sump. This forces the liquid in the sump through the pipe or conduit 35 into the reservoir 36.

The structure illustrated in Fig. 1 is designed for use either with air under pressure or with vacuum, the vacuum connections being shown at 37, the conduit opening into the reservoir 36 at 38. This vacuum connection is provided with a valve 39, the valve being a two-way valve adapted to connect the reservoir to a source of vacuum or to the atmosphere, the atmosphere port being shown at 40.

The source of vacuum may be the intake manifold of an internal combustion engine. The structure illustrated is adapted for use as a control clutch for an internal combustion engine to a centrifugal pump. Neither the pump nor the internal combustion engine manifold are illustrated, but the advantage of this source of vacuum will be appreciated when it is understood that the centrifugal pumps may be mounted on the chassis of a motor vehicle and driven from the motor of the vehicle, this providing highly desirable fire fighting equipment, utilizing trucks and even pleasure vehicles.

When vacuum is used the valve 39 is adjusted to connect the reservoir 36 to the source of suction and this results in the raising or drawing of liquid from the sump into the reservoir 36. The reservoir is provided with an outwardly opening discharge valve 41, normally seated by means of the spring 42. As long as the vacuum is maintained in the reservoir 36 the discharge valve remains seated or closed. However, as soon as the valve 39 is adjusted to cut off the vacuum and connect the reservoir to the atmosphere, the weight of the liquid opens the valve 41 and the liquid is discharged into the auxiliary reservoir or chamber 43 and from thence through the pipe or conduit 44 into the chambered clutch member 3. This provides effective manual control of the clutch.

The fluid is delivered to the clutch while the driving member is rotating and after it has reached such a speed as to close the valves 19. The liquid being retained in the clutch member 3 is subjected to centrifugal action and actuates the clutch engaging members 18. When the driven member is stopped or when the speed falls below a predetermined rate, the valves 19 automatically open and the liquid is discharged. This insures that the prime mover has attained the desired speed before the clutch is engaged, and this is particularly desirable where electric motors are used.

With this arrangement of parts a very simple and effective control is provided and it has a wide application. It will be understood that the control valves 33, when pressure is used, and 39, when vacuum is used, may be located as desired or remote controls may be employed.

The embodiment of the invention shown in Fig. 5 is designed for use where vacuum or air under pressure is not available or where installations are such that connections are not conveniently made or where economy is an important factor. In that structure the casing 45 is provided with an outwardly opening drain valve 46, held against the seat 47 by spring 48, this spring, however, being such that the weight of the mercury or other liquid is sufficient to open the valve and permit the liquid to discharge into sump 49. At one side of the sump is a plunger barrel 50 receiving the displacement plunger 51 which is normally retracted to permit the liquid to flow into the sump 49. When the plunger is advanced into the sump a sufficient quantity of liquid is displaced or poured therefrom through the pipe 52 into the chambered driving member 53 of the clutch, the coacting driven member being shown at 54 and the clutch engaging member being shown at 55.

In this structure the discharge valves 56 coact with ports 57 in the periphery of the member 53, the stems of the valves reciprocating in guides 58 and being urged to the open position by spring 59. The valves here are seated by the centrifugal action when the R. P. M. of the member 53 reaches a predetermined rate. The plunger rod 60 may be connected to a suitable remote control or provided with a hand piece, not shown. This plunger rod is provided with a packing 61 seated against the ring 62, the packing gland 63 being adjustable to properly seal the plunger rod. When the plunger is moved into the sump the pressure on the liquid insures the seating of the valve 46.

Figure 6:
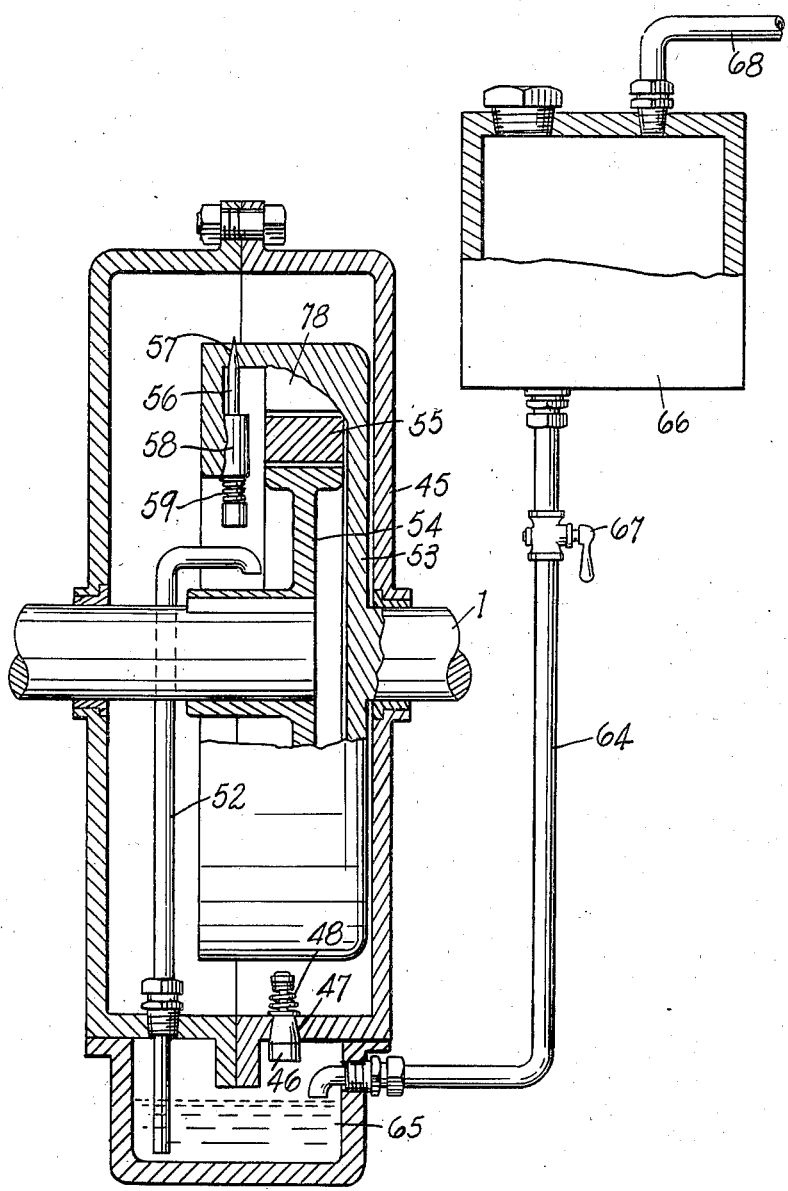
Fig. 6 is a fragmentary view partially in section of a further modification or embodiment of my invention in which the return of the liquid to the clutch is pressure controlled.

In the embodiment of the invention shown in Fig. 6, the parts are the same as shown in Fig. 5 with the exception that the cylinder and plunger are omitted and an air conduit 64 is connected to the sump 65. This conduit 64 is connected to the air pressure tank 66 and is controlled by the valve 67. Air is supplied to the tank through the conduit 68. This structure is somewhat similar to the embodiment shown in Figs. 1 and 2, which is adapted either for air pressure or vacuum.

The modification shown in Fig. 7 is an adaptation for vacuum control only. Here the sump 69 is connected by conduit 70 to the reservoir 71, the reservoir being connected to a source of vacuum 72 controlled by the valve 73, to connect it either to the source of vacuum or the atmosphere. The discharge is through the valve 74 and conduit 75.

In Fig. 8 is illustrated the arrangement of valves and relationship of the driving and driven clutch members and the clutch engaging members. Here the clutch engaging members 76 have driving connection to the driven clutch member 77 through the lugs 78.

I have illustrated and described the invention in a highly satisfactory embodiment thereof. I have not attempted to illustrate various other adaptations and embodiments which I contemplate, as it is believed this disclosure will enable those skilled in the art to embody or adapt the improvements as may be desired.

Having thus described my invention, what I claim as new and desire to secure by Letters Patent, is:

1. In a clutch, the combination of a casing having a sump associated therewith, a chambered driving member adapted to receive a fluent material and provided with discharge ports discharging into said casing, normally open valves coacting with said ports, said valves being seated by rotation of said driving member, a driven member disposed within said driving member, a plurality of clutch elements radially movable relative to both members and rotatably connected with one member and drivingly engageable with the other, a reservoir having a suction connection to said sump and a valved connection to a source of vacuum, and a discharge connection for said reservoir for delivering fluent material into said driving member chamber.

2. In a clutch, the combination of an outer chambered clutch member adapted to receive a liquid and provided with peripheral discharge ports, an inner clutch member disposed within said chambered member, clutch elements disposed within said chambered member to be actuated by the liquid when the liquid is subjected to centrifugal action, said clutch elements being rotatable with one of said members and clutchingly engageable with the other when so actuated, valves for said ports adapted to be actuated to closed position by centrifugal force and to open when not subjected to such force, a casing for said clutch members into which the liquid is discharged when the valves are open having a sump associated therewith, a reservoir connected to said sump and connectable to a source of vacuum whereby the liquid may be transferred from said sump to said reservoir, said reservoir being also ventable to the atmosphere, and a discharge connection for said reservoir to said chambered clutch member, said discharge being provided with a valve seated by the combined action of a spring and vacuum within said reservoir, the spring being of insufficient tension to seat the valve against the weight of the liquid when the source of vacuum is cut off and the reservoir vented to the atmosphere.

3. In a clutch, the combination of driving and driven clutch members, one of said members being chambered and adapted to receive a liquid, a discharge valve for said chamber actuated to closed position by centrifugal force resulting from the rotation of said clutch member and automatically opening when not subject to such force, a liquid actuated clutch engaging element operatively associated with said clutch members to be actuated by the liquid within said chamber when it is subjected to centrifugal force, a fixed casing for said clutch members into which the liquid is discharged from said chambered clutch chamber, a sump having a return check valve connection to said casing, and manually controlled air pressure means for returning the liquid from said sump to said chambered clutch member.

4. In a clutch, the combination of driving and driven clutch members, one of said members having a liquid chamber therein, a discharge valve for said liquid chamber actuated to closed position by centrifugal force resulting from the rotation of said clutch member, a liquid actuated clutch engaging element operatively associated with said clutch members to be actuated by the liquid within said chamber when it is subjected to centrifugal force, a casing into which the liquid is discharged from said chambered clutch member, a sump associated with said casing, a reservoir having an inlet connection to said sump and a discharge connection to said chambered clutch member, and a gaseous pressure differential means for transferring the liquid from said sump to said reservoir including means for manually controlling the gaseous pressure differential means and the discharge of the liquid from said reservoir to said chambered clutch member.

5. In a clutch, the combination of a clutch member having a liquid chamber therein, said chamber having a discharge valve adapted to be actuated to closed position by centrifugal force and to open when not subjected to such force, a coacting clutch member disposed within said chambered member, a clutch element disposed within said chambered member to be actuated by the liquid therein when the liquid is subjected to centrifugal action, said clutch element being rotatable with one of said members and drivingly engageable with the other when so actuated, a casing into which said clutch member chamber discharges having a sump associated therewith, a reservoir connected to said sump and connectable to a source of vacuum whereby the liquid may be transferred from said sump to said reservoir, said reservoir being also ventable to the atmosphere, and a discharge connection for said reservoir to said clutch member chamber, said discharge being provided with a valve which remains closed when the reservoir is subject to vacuum and is opened by the weight of the liquid when the reservoir is vented to the atmosphere.

6. In a clutch, the combination of a clutch member having a liquid chamber therein, said chamber having a discharge valve adapted to be actuated to closed position by centrifugal force and to open when not subjected to such force, a coacting clutch member disposed within said chambered member, a clutch element disposed within said chambered member to be actuated by the liquid therein when the liquid is subjected to centrifugal action, said clutch element being rotatable with one of said members and drivingly engageable with the other when so actuated, a casing into which said clutch member chamber discharges having a sump associated therewith, a reservoir connected to said sump, air pressure means for transferring liquid from said sump to said reservoir, and a discharge connection for said reservoir to said clutch member chamber.

7. In a clutch, the combination of driving and driven clutch members, one of said members having a liquid chamber therein, a liquid actuated clutch engaging element operatively associated with said clutch members to be actuated by the liquid within said chamber when it is subjected to centrifugal force, a discharge valve for said liquid chamber actuated to closed position by the rotation of said clutch members, a non-rotatable casing into which the liquid is discharged from said chambered clutch member, said casing having a sump associated therewith to receive the liquid, and variable air pressure means for transferring the liquid from said sump to said chambered clutch member.

8. In a clutch, the combination of driving and driven clutch members, one of said members having a liquid chamber therein, a liquid actuated clutch engaging element operatively associated with said clutch members to be actuated to clutch engaging position by the liquid within said chamber when the liquid is subjected to centrifugal force, means for retaining liquid within said chamber while the liquid is subject to such centrifugal force as to distribute it annularly within the chamber, a casing into which the liquid is discharged from said chambered clutch member, a sump associated with said casing, and manually controlled means for transferring the liquid from said sump to said chambered clutch member comprising a gaseous pressure medium.

9. In a clutch, the combination of driving and driven clutch members, and a cooperating liquid actuated clutch engaging element associated with said clutch members to be actuated by centrifugal action resulting from the rotation of the driving clutch element, means being provided for discharging the liquid from cooperating relation to the clutch members and clutch engaging element when the driving member of the clutch is at rest and retaining it while the driving clutch member is rotating, a sump into which the discharged liquid is collected, a reservoir connected to said sump and connectable to a source of vacuum whereby the liquid may be transferred from said sump to said reservoir, said reservoir being also ventable to the atmosphere, and a discharge connection for said reservoir to said chambered clutch member, said discharge being provided with a valve seated by the combined action of a spring and vacuum within said reservoir, the spring being of insufficient tension to seat the valve against the weight of the liquid when the source of vacuum is cut off and the reservoir vented to the atmosphere.

10. In a clutch, the combination of driving and driven clutch members, and a cooperating liquid actuated clutch engaging element associated with said clutch member to be actuated by centrifugal action resulting from the rotation of the driving clutch element, means being provided for discharging the liquid from cooperating relation to the clutch members and clutch engaging element when the driving member of the clutch is at rest and retaining it while the driving clutch member is rotating, a sump into which the discharged liquid is collected, a reservoir connected to said sump, vacuum means for transferring the liquid from said sump to said reservoir, and means whereby said liquid is transferred from said reservoir to operative relation to said clutch members and element by gravity.

11. In a clutch, the combination of driving and driven clutch members, and a cooperating liquid actuated clutch engaging element associated with said clutch members to be actuated by centrifugal action resulting from the rotation of the driving clutch element, means being provided for discharging the liquid from cooperating relation to the clutch members and clutch engaging element when the driving member of the clutch is at rest and retaining it while the driving clutch member is rotating, a sump in which the discharged liquid is collected, a reservoir connected to said sump, variable pressure means for transferring the liquid from said sump to said reservoir, and means whereby said liquid is transferred from said reservoir to operative relation to said clutch members.

12. In a clutch, the combination of driving and driven clutch members, and a cooperating liquid actuated clutch engaging element associated with said clutch members to be actuated by centrifugal action resulting from the rotation of the driving clutch element, means being provided for discharging the liquid from cooperating relation to the clutch members and clutch engaging element when the driving member of the clutch is at rest and retaining it while the driving clutch member is rotating, a sump into which the discharged liquid is collected, and manually controlled air pressure means for transferring the liquid from said sump to said clutch.

13. In a clutch, the combination of driving and driven clutch members, and a cooperating liquid actuated clutch engaging element associated with said clutch members to be actuated by centrifugal action resulting from the rotation of the driving clutch element, means being provided for discharging the liquid from cooperating relation to the clutch members and clutch engaging element when the driving member of the clutch is at rest and retaining it while the driving clutch member is rotating, a sump into which the discharged liquid is collected, a reservoir, air pressure means for transferring liquid from said sump to said reservoir, and connections whereby liquid is delivered from said reservoir to the driven clutch member.

14. A clutch comprising a driving member, a driven member, and a fluid actuated element operatively associated with said driving and driven members, the driving member being chambered to receive fluid by which the fluid actuated clutch element is actuated when the fluid is subjected to centrifugal force resulting from the rotation of the driving member, said driving member being provided with a fluid discharge normally open when the driving member is at rest or its rotation is below a predetermined rate and closed when the rotation of said driving member exceeds such predetermined rate, a sump receiving the fluid discharged from said driving member through a return check valve, and a manually controlled means for displacing fluid in said sump for returning it to said driving member.

15. A clutch comprising a driving and driven clutch members, the driving clutch member having a fluid chamber therein with a valved discharge opening open when the member is at rest and closed by centrifugal action resulting from the rotation of said member above a predetermined rate, a casing into which the fluid is discharged from said discharge opening, a sump having a check valved drain connection to said casing, a return connection for said sump to said chambered clutch member, and means for delivering air under pressure to said sump for delivering fluid therefrom to said chambered clutch member.

16. A clutch comprising a driving and driven clutch members, the driving clutch member having a fluid chamber therein with a valved discharge opening open when the member is at rest and closed by centrifugal action resulting from the rotation of said member above a predetermined rate, a casing into which the fluid is discharged from said discharge opening, a sump having a check valved drain connection to said casing, a return connection for said sump to said chambered clutch member, and means manually controlled for applying pressure to the fluid in said sump for returning fluid to said chambered clutch member.

17. A clutch comprising driving and driven clutch members, the driving clutch member being chambered to receive a fluid and having a peripherally positioned fluid discharge passage, valve means for said passage carried by said driving clutch member and adapted to be closed by the action of centrifugal force when the speed or rotation of the driving member is above a predetermined speed and to open automatically when the speed of rotation of the driving member is below said predetermined speed, a sump for receiving the discharged fluid, and manually controlled means for subjecting the fluid in said sump to air pressure for returning it to said chambered clutch member.

18. In a clutch, the combination of driving and driven clutch members, one of said members having a liquid chamber therein, a discharge for said liquid chamber which is closed by the rotation of the clutch member having the liquid chamber, a liquid actuated clutch engaging element operatively associated with and movable relative to both of said clutch members to be actuated to engaged position by the liquid within said chamber when it is subject to centrifugal force, a non-rotatable casing into which the liquid is discharged from said chambered clutch member when the speed thereof falls below a predetermined rate, a sump associated with said casing to receive the liquid therefrom, and means for returning the liquid from said sump to said chamber independently of the rotation thereof.

19. In a clutch, the combination of driving and driven clutch members, one of said clutch members having a liquid chamber therein, a discharge for said liquid chamber which is closed by the rotation of said clutch member having the liquid chamber therein, a clutch engaging element operatively associated with both of said clutch members, said clutch engaging element being movably associated with one of said clutch members for rotation therewith and to be engaged with the other clutch member by liquid within said chamber when it is subject to such centrifugal force, a non-rotatable casing into which the liquid is discharged from said chambered clutch member when the speed thereof falls below a predetermined rate, a sump associated with said casing to receive the liquid therefrom, and manually controlled means for returning the liquid from said sump to said chamber independently of the rotation of either of said driving or driven clutch members.

20. In a clutch, the combination of driving and driven clutch members, one of which has a liquid chamber therein, a discharge for said liquid chamber which is closed by the rotation of the clutch member having the liquid chamber, a casing into which the liquid is discharged from said chamber when the speed of the chambered clutch member falls below a predetermined rate, a clutch engaging element movably engaged with one of said clutch members for rotation therewith and actuated into engagement with the other clutch member by liquid within said chamber when it is subject to centrifugal force, a sump associated with said chambered clutch member to receive the liquid therefrom, the sump being so positioned and of such capacity that the level of the discharged liquid is below the clutch members, and means independent of the rotation of said clutch members for returning the liquid from said sump to said chamber within said clutch member.

21. In a clutch, the combination of driving and driven clutch members, one of which has a liquid chamber therein and a discharge for said liquid chamber which is closed by the rotation of the clutch member, a clutch engaging element movably engaged with one of said clutch members for rotation therewith and actuated into engagement with the other clutch member by liquid within said chamber when it is subject to centrifugal force, a sump associated with said chambered clutch member to receive the liquid discharged therefrom, the sump being so positioned and of such capacity that the level of the fully discharged liquid is below the clutch members, and manually controlled means independent of the rotation of said clutch members for returning the liquid from said sump to said chamber within said clutch member.

22. In a clutch, the combination of driving and driven clutch members, one of which has a liquid chamber therein and a discharge for said liquid chamber which is closed by the rotation of the clutch member, a clutch engaging element movably engaged with one of said clutch members for rotation therewith and actuated into engagement with the other clutch member by liquid within said chamber when it is subject to centrifugal force, centrifugal force in the absence of liquid acting to move said clutch engaging element to clutch disengaging position, a sump associated with said chambered clutch member to receive the liquid discharged therefrom, the sump being so positioned and of such capacity that the level of the fully discharged liquid is below the clutch members, and means independent of the rotation of said clutch members for returning the liquid from said sump to said chamber within said clutch member.

23. In a clutch, the combination of driving and driven clutch members, one of said members having a chamber therein, said chamber being provided with a discharge which is closed by the rotation of said clutch member when its speed exceeds a predetermined rate, a liquid actuated clutch engaging member operatively associated with and movable relative to both of said clutch members and having driving engagement with one of them for rotation therewith and actuated to engaged position with the other clutch member by liquid within the chamber when it is subject to centrifugal force, a sump associated with said chambered clutch member to receive liquid discharged therefrom, and means for returning the liquid from said sump to said chamber independently of the rotation of either of said clutch members.

24. A clutch comprising driving and driven clutch members, the driving clutch member having a fluid chamber therein and being provided with an angular discharge passage for said chamber, the discharge end of the passage being directed rearwardly relative to the direction of rotation of said driving clutch member whereby the discharge of the fluid under centrifugal force resulting from the rotation of said member is checked, a casing enclosing said driving clutch member and into which its said passage discharges, a valve provided with means acting to automatically open it when the speed of rotation of said driving clutch member falls below a predetermined rate, said valve being closed by centrifugal force and maintained in closed position when the speed of rotation in said chambered clutch member exceeds such predetermined rate, a sump for receiving the discharged fluid from said casing, and means for returning the discharged fluid to said chambered clutch member independently of the rotation of either of said clutch members.

25. In combination with a liquid actuated clutch wherein driving engagement between driving and driven members is established upon rotation of one of the members by liquid thrown centrifugally outwardly into a liquid driving chamber formed in one of the members, walls forming passage means leading from said chamber and communicating with a reservoir, valve means for said passage means mounted on one of the members constructed and arranged to be maintained closed by the action of centrifugal force when the speed of rotation of the driving member is above a predetermined minimum speed and to open automatically when the speed of rotation of the driving member is reduced to said predetermined minimum speed, and means for transferring liquid from the reservoir to said liquid driving chamber.

26. In combination with a liquid actuated clutch wherein driving engagement between driving and driven members is established upon rotation of one of the members by liquid thrown centrifugally outwardly into a liquid driving chamber formed in one of the members, an outer casing having a reservoir therein, means journaling the clutch in the casing, walls forming passage means leading from said chamber and communicating with the reservoir, valve means for said passage means mounted on one of the members constructed and arranged to be maintained closed by the action of centrifugal force when the speed of rotation of the driving member is above a predetermined minimum speed and to open automatically when the speed of rotation of the driving member is reduced to said predetermined speed, and means for transferring liquid from the reservoir directly to the interior of the clutch.

27. In combination with a liquid actuated clutch wherein driving engagement between driving and driven members is established upon rotation of one of the members by liquid thrown centrifugally outwardly into a liquid driving chamber formed in one of the members, an outer casing having a reservoir therein, means journaling the clutch in the casing, walls forming passage means leading from said chamber and communicating with the reservoir, valve means for said passage means mounted on one of the members constructed and arranged to be maintained closed by the action of centrifugal force when the speed of rotation of the driving member is above a predetermined speed and to open automatically when the speed of rotation of the driving member is reduced to said predetermined speed, and means for transferring liquid from the reservoir to said liquid driving chamber including a piston mounted for movement in the reservoir, and a pipe connected with the reservoir and discharging into the interior of the clutch.

28. In combination with a mercury actuated clutch wherein driving engagement between driving and driven members is established upon rotation of the driving member by mercury thrown centrifugally outwardly into a driving chamber formed in the driving member, walls forming passage means leading from said chamber and communicating with a reservoir, means rendered operative by reducing the speed of rotation of the driving member to a predetermined minimum speed to drain mercury from said chamber into said reservoir, and means for transferring mercury from the reservoir to said driving chamber.

29. In combination with a liquid actuated clutch wherein driving engagement between driving and driven members is established upon rotation of one of the members by liquid thrown centrifugally outwardly into a liquid driving chamber formed in one of the members, walls forming passage means leading from said chamber and communicating with a reservoir, valve means for said passage means mounted on one of the members, means maintaining said valve means open when the clutch is at rest and until the speed of rotation of the driving member reaches a predetermined minimum speed, means operated by the action of centrifugal force when the speed of rotation of the driving member is above said predetermined minimum speed to close said valve means and maintain the valve means closed while the driving member rotates at a speed above said predetermined speed, and means for transferring liquid from the reservoir to said liquid driving chamber.

30. In a clutch, the combination of driving and driven clutch members, one of said members having a chamber therein, said chamber being provided with a discharge which is closed by the rotation of said clutch member when its speed exceeds a predetermined rate, a liquid actuated clutch engaging member operatively associated with and movable relative to both of said clutch members and having driving engagement with one of them for rotation therewith and actuated to engaged position with the other clutch member by liquid within the chamber when it is subject to centrifugal force, a sump associated with said chambered clutch member to receive liquid discharged therefrom, and means for transferring the liquid from said sump to said clutch member chamber independently of the rotation of either of said clutch members including a piston mounted to be projected into said sump to displace liquid therein and a pipe connected to said sump and discharging to said chamber.

31. In a clutch, the combination of driving and driven clutch members, one of said members having a chamber therein, said chamber being provided with a discharge which is closed by the rotation of said clutch member when its speed exceeds a predetermined rate, a liquid actuated clutch engaging member operatively associated with and movable relative to both of said clutch members and having driving engagement with one of them for rotation therewith and actuated to engaged position with the other clutch member by liquid within the chamber when it is subject to centrifugal force, a sump associated with said chambered clutch member to receive liquid discharged therefrom comprising a displacement plunger operatively associated with said sump, said sump having a return pipe connection to said chamber.

ADRIAN P. ADNEY.